Patented Mar. 11, 1941

2,234,626

UNITED STATES PATENT OFFICE 2,234,626

MANUFACTURE OF VISCOSE SOLUTIONS

Hendrik L. Bredee, Breda, Netherlands, assignor to American Enka Corporation, Enka, N. C., a corporation of Delaware No Drawing. Application November 8, 1938, Serial No. 239,550. In Germany December 9, 1937

10 Claims. (Cl. 260—217)

The present invention relates to the manufacture of viscose solutions and more particularly to a process of treating cellulosic materials having a high percentage of alpha-cellulose.

At the time when the rayon industry was less advanced than it is at present, the starting material, namely, cellulose produced principally by the sulphite process, was not of the same degree of purity as that now used. In other words, the alpha-cellulose content was in the neighborhood of 87% to 89%. Among other impurities, a certain amount of colored materials existed which were not eliminated during the bleaching operation or other subsequent manufacturing steps necessary to provide viscose threads, films and the like therefrom. Therefore, during the development of the rayon manufacturing process, the requirements for starting materials became stricter and as a result a much more highly purified cellulose was brought into commercial use, which, when spun, produced a whiter product.

It has now been determined that the special purifying operations to which the cellulosic materials are subjected are accompanied by, and associated with, a number of disadvantages and objections. The processes employed to remove the coloring matter also act to take out certain other constituents that would otherwise have a favorable effect on the spinning process and would otherwise improve the characteristics of the product formed thereby. These disadvantages are evident with the several different types of cellulose used in the manufacture of rayon; i. e., sulphite cellulose having a high alpha-cellulose content of 93% to 95% obtained by special alkaline after-treatment and generally known as alpha-fiber, sulphate cellulose macerated by the alkaline process, sulphite cellulose highly purified and cotton linters.

Specifically, some of the objections referred to are as follows:

1. Alkali cellulose sheets that have been soaked in caustic soda solutions and pressed to a high degree are extremely difficult to convert into the desired form during the subsequent shredding operation. It is necessary to comminute the sheets into the form of small light flakes and this is not normally possible. In fact, sulphate cellulose is entirely unsuitable in this process. The size and uniformity of the flakes have a marked effect on the final product.

2. In the production of delustered thread, difficulty is encountered in the preparation of highly dispersed emulsions used in the viscose when very pure celluloses are employed.

3. The use of highly purified cellulose materially impairs the spinning process per se because the strength of the individual filaments is lowered, resulting in numerous interruptions due to breaking of these filaments.

4. A phenomenon that is particularly noticeable is the "mottled milky" effect in thread produced from insufficiently matured viscose which in turn is derived from highly purified cellulose. It is desirable to impart to the thread a uniform brightness and tone and this is substantially accomplished by the addition of resins during the manufacturing process.

By analysis of cellulosic materials of different degrees of purity, it has been ascertained that among the constituents removed are several chemical compounds that it is desirable to retain or replace in the cellulose in order to avoid the aforementioned difficulties. These materials consist essentially of resin acids, such as abietic acid, pimaric acid and/or salts of the same commonly known as resinates.

It is, therefore, the object of the present invention to incorporate in the cellulose, or at some stage during the manufacturing process, the necessary constituents that have been removed by prior purification.

The invention specifically contemplates the inclusion or replenishment of resin acids, resin acid salts or mixtures of the same at a suitable point during the viscose manufacture, depending on the circumstances and the effect which it is desired to obtain; e. g., the materials may be added to the sulphite or sulphate cellulose, to the immersion lye, to the alkali cellulose at the initiation of the shredding operation, to the dilute lye (solvent for the xanthate), or to the viscose solution itself. More explicitly, the point at which the constituents are to be added depends on the results desired. If it is necessary to increase the dispersion of the delusterant such as an oil emulsion, or improve the spinning process, the resin acids or resin soaps can be added to the alkaline solvent for the xanthate or to the viscose solution. If it is desirable to overcome the difficulties involved in the shredding of the alkali cellulose sheets, the material is incorporated in the soaking lye or to the alkali cellulose sheets at the commencement of the shredding operation; in either case the resins become intimately admixed with the cellulose. Viscose may be commercially manufactured from sulphate cellulose by using these resins during the shredding stage.

The invention may be more readily appreciated by reference to the following specific examples:

Example 1.—124 kg. of highly purified white sulphite cellulose sheets having a moisture content of 11% are immersed in the usual manner in a caustic soda solution and thereafter removed and compressed until the alkali cellulose decreases to a weight of 310 kg. The alkali cellulose sheets are then placed in a shredder and during the initiation of the shredding operation, 300 grams of dry technical sodium abietate in the form of powder is dispersed in the shredder. By the addition of the resin soap the shredding period is considerably shortened and the cellulose particles are more finely and uniformly produced. After the alkali cellulose crumbs or particles have been reacted with carbon disulphide and dissolved in dilute caustic to provide a viscose solution, 10 kg. of turpentine are added to the said viscose. A turpentine emulsion is subsequently obtained having an average particle size of from 1 to 2 microns, the maximum particle size being 4 microns. Without the addition of the resin the average particle sizes are from 4 to 8 microns, while the maximum particles are 15 microns.

Example 2—Two batches of alkali cellulose are produced, each of which is made from 124 kg. of sulphate cellulose. These two batches are each compressed to a weight of 370 kg. In the first batch, 360 grams of powdered technical sodium abietate are added at the commencement of the shredding operation. The second batch is maintained in situ. The following shredding results were obtained:

*First batch with resin addition*

| Shredding time | Shredding degree |
|---|---|
| | Percent |
| ½ hour | 68 |
| 1 hour | 82 |
| 2 hours | 90 |
| 3 hours | 96 |

*Second batch without resin addition*

| Shredding time | Shredding degree |
|---|---|
| | Percent |
| ½ hour | 49 |
| 1 hour | 71 |
| 2 hours | 84 |
| 3 hours | 87 |

In addition to the above advantage the batch with the resin addition produced a viscose solution having improved characteristics, while the batch without the addition of resin provided a viscose solution that filtered poorly and produced filaments of low strength, a large number of which broke during spinning.

Example 3.—To 1250 kg. of viscose having 8% cellulose and produced from a highly purified sulphite cellulose having 89% alpha-cellulose content is added a solution of 400 grams of resin soap in 10 litres of water. A finely dispersed emulsion is obtained by the addition of turpentine and the same is mixed with the viscose in a normal agitator. Using the same ingredients, but omitting the resin, an extremely poor emulsion is obtained. The viscose that contains the resin soap is spun without any difficulty in a normal zinc-containing spinning bath; whereas the viscose without the addition of resin produces a thread of very poor quality, the filaments of which are non-uniform in strength. Owing to the large number of broken filaments, many spinnerets had to be exchanged.

It is to be understood that this invention is not to be restricted to the foregoing specific examples, as the invention broadly contemplates the addition of resinous materials to highly purified cellulose; e. g., cellulose having an alpha-cellulose content usually above 89%.

What I claim is:

1. Incident to the manufacture of viscose threads, films and the like, the steps which consist in adding a solution of a resin soap to a viscose solution derived from a highly purified sulphite cellulose, and mixing a small quantity of an oil delusterant therewith, whereby an extremely fine dispersion is effected.

2. A process of manufacturing viscose which comprises immersing 124 kg. of highly purified sulphite cellulose sheets in a caustic soda solution and thereafter compressing the saturated sheets to a weight of 310 kg., placing the sheets in a shredder and during the initiation of the shredding operation, dispersing 300 grams of sodium abietate therewith, comminuting the mixture and reacting the same with carbon disulphide, dissolving the resulting xanthate in dilute caustic to provide a viscose solution and effecting a highly dispersed suspension of 10 kg. of turpentine with the said viscose solution.

3. Incident to the manufacture of viscose threads, films and the like, the step which comprises adding 360 grams of sodium abietate to alkali cellulose produced from 124 grams of sulphate cellulose, said addition being made during the shredding period.

4. In a process of manufacturing viscose which comprises treating cellulose having an alpha cellulose content not substantially less than 89% with a caustic soda solution to form alkali cellulose, removing the excess of alkali from the alkali cellulose, shredding the alkali cellulose to disintegrate the same to finely divided particles, reacting the particles with carbon disulphide and forming a viscose solution by dissolving the resultant xanthate in dilute caustic, the step which consists in adding to the cellulosic mass during said process a small proportion of a resinous substance selected from the class consisting of resin acids and resinates.

5. In a process of manufacturing viscose which comprises treating cellulose having an alpha cellulose content not substantially less than 89% with a caustic soda solution to form alkali cellulose, shredding the alkali cellulose to disintegrate the same to finely divided particles, reacting the particles with carbon disulphide, and forming a viscose solution by dissolving the resultant xanthate in dilute caustic; the step which consists in adding to the cellulosic mass during said process a small proportion, sufficient to improve the uniformity of strength of filaments spun from the viscose solution and inhibit breakage thereof during and after spinning, of a resinous substance selected from the class consisting of resin acids and resinates.

6. In a process of manufacturing viscose which comprises treating cellulose having an alpha cellulose content not substantially less than 89% with a caustic soda solution to form alkali cellulose, removing the excess of alkali from the alkali cellulose, shredding the alkali cellulose to disintegrate the same to finely divided particles, reacting the particles with carbon disulphide and forming a viscose solution by dissolving the resultant xanthate in dilute caustic, the step which consists in adding to the cellulosic mass during the shredding operation a small proportion of a resinous substance selected from the class consisting of resin acids and resinates.

7. In a process of manufacturing viscose which comprises treating cellulose having an alpha cellulose content not substantially less than 89% with a caustic soda solution to form alkali cellulose, removing the excess of alkali from the alkali cellulose, shredding the alkali cellulose to disintegrate the same to finely divided particles, reacting the particles with carbon disulphide and forming a viscose solution by dissolving the resultant xanthate in dilute caustic, the step which consists in adding to said dilute caustic a small proportion of a resinous substance selected from the class consisting of resin acids and resinates.

8. In a process of manufacturing viscose which comprises treating cellulose having an alpha cellulose content not substantially less than 89% with a caustic soda solution to form alkali cellulose, removing the excess of alkali from the alkali cellulose, shredding the alkali cellulose to disintegrate the same into finely divided particles, reacting the particles with carbon disulphide and forming a viscose solution by dissolving the resultant xanthate in dilute caustic, the step which consists in adding to the viscose solution a small proportion of a resinous substance selected from the class consisting of resin acids and resinates.

9. In a process of manufacturing viscose which comprises treating a highly purified sulphite cellulose having an alpha-cellulose content above 89% with a caustic soda solution to form alkali cellulose, shredding the alkali cellulose to disintegrate the same to finely divided particles, reacting the particles with carbon disulphide and dissolving the resultant xanthate in dilute caustic to provide a viscose solution; the step which consists in dispersing a small proportion of a resinate with the alkali cellulose during the shredding operation.

10. In a process of manufacturing viscose which comprises treating a highly purified sulphite cellulose having an alpha-cellulose content of from 93% to 95% with a caustic soda solution to form alkali cellulose, shredding the alkali cellulose to disintegrate the same to finely divided particles, reacting the particles with carbon disulphide and dissolving the resultant xanthate in dilute caustic to provide a viscose solution; the step which consists in dispersing a small proportion of a resinate with the alkali cellulose during the shredding operation.

HENDRIK L. BREDEE.